United States Patent
Tsui et al.

(10) Patent No.: US 8,966,161 B2
(45) Date of Patent: Feb. 24, 2015

(54) MEMORY STORAGE DEVICE AND RESTORING METHOD THEREOF

(71) Applicant: Phison Electronics Corp., Miaoli (TW)

(72) Inventors: Te-Change Tsui, Hsinchu (TW); Tzung-Lin Wu, Taichung (TW)

(73) Assignee: Phison Electronics Corp., Miaoli (TW)

( * ) Notice: Subject to any disclaimer, the term of this patent is extended or adjusted under 35 U.S.C. 154(b) by 284 days.

(21) Appl. No.: 13/632,161

(22) Filed: Oct. 1, 2012

(65) Prior Publication Data

US 2014/0013029 A1 Jan. 9, 2014

(30) Foreign Application Priority Data

Jul. 9, 2012 (TW) .............................. 101124630 A

(51) Int. Cl.
*G06F 12/16* (2006.01)
(52) U.S. Cl.
USPC ............ 711/103; 711/154; 711/162; 711/165
(58) Field of Classification Search
CPC .......................... G06F 11/1417; G06F 11/1402
USPC .................................. 711/103, 154, 162, 165
See application file for complete search history.

(56) References Cited

U.S. PATENT DOCUMENTS

| | | | | |
|---|---|---|---|---|
| 6,430,662 B1* | 8/2002 | Hurich et al. | ................. | 711/162 |
| 6,591,376 B1* | 7/2003 | VanRooven et al. | ............ | 714/36 |
| 2002/0174283 A1* | 11/2002 | Lin | ................................... | 711/1 |
| 2008/0120353 A1* | 5/2008 | Kwon | .......................... | 707/204 |
| 2008/0140969 A1* | 6/2008 | Lawrence | ..................... | 711/163 |
| 2011/0218966 A1* | 9/2011 | Barnes et al. | ................. | 707/645 |
| 2012/0084601 A1* | 4/2012 | Lee et al. | ........................ | 714/15 |
| 2014/0189234 A1* | 7/2014 | Tang et al. | .................... | 711/113 |

\* cited by examiner

*Primary Examiner* — John Lane
(74) *Attorney, Agent, or Firm* — Jianq Chyun IP Office

(57) ABSTRACT

A memory storage device and a repairing method thereof are provided. The memory storage device has a rewritable non-volatile memory module having multiple physical units. The physical units include at least one backup physical unit which is configured to be accessed only by a specific command set and stored with at least one customized data. The method includes receiving a specific read command from a host system for reading the backup physical unit and transmitting the customized data therein to the host system when the memory storage device is capable of receiving and processing commands from the host system, the specific read command belongs to the specific command set; and writing the customized data from the host system into a corresponding physical unit to restore the memory storage device to a factory setting when receiving the writing command from the host system for writing the customized data.

24 Claims, 9 Drawing Sheets

| | | |
|---|---|---|
| | 53 | 55 |
| | MBR | LBA(10) |
| | Boot sector | LBA(20) |
| | File allocation table | LBA(30) |
| | Root directory | LBA(40) |
| | Device specification information | LBA(50) |
| | Customized application | LBA(100) |

MEMORY STORAGE DEVICE AND RESTORING METHOD THEREOF

CROSS-REFERENCE TO RELATED APPLICATION

This application claims the priority benefit of Taiwan application serial no. 101124630, filed on Jul. 9, 2012. The entirety of the above-mentioned patent application is hereby incorporated by reference herein and made a part of this specification.

BACKGROUND OF THE INVENTION

1. Field of the Invention

The invention relates to a repairing method of a memory storage device, and more particularly, to a repairing method capable of restoring a memory storage device to a factory setting at client end and the memory storage device using the same.

2. Description of Related Art

Since flash memories are adapted have the characteristics of non-volatile, power saving, smaller size, and non-mechanical inner structure, flash memories are suitable for being used as portable storage devices. Portable device such as a memory card or a flash drive adopts flash memory as storage medium therein.

However, while using a portable storage device, users may notice that abnormal operations may occur due to personal factors such as improper use, or various other unexpected reasons. Abnormal operations of the portable storage device may cause problems such as partial data loss, or even disasters like incapable of power-on for data accessing. Accordingly, sending the portable storage back to the manufacturer may be the only option since the users may not be able to repair it all by themselves.

The memory storage device may not be recovered back to it factory setting in a short period of time as the customers required, because the maintain department of the manufacturer may need to handle all products from various region or may be lack of related information of the products during their production. From the viewpoint of the user, when sending device for maintenance, not only does it cost money, but also requires a long period of time for waiting. In view of above, it is necessary to develop a mechanism that allows users to repair the storage device by themselves.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the invention is directed to a memory storage device and a repairing method thereof, which may conveniently restore the memory storage device to factory setting.

A repairing method of a memory storage device is provided, which is adapted for a memory storage device having a rewritable non-volatile memory module, the rewritable non-volatile memory module comprises a plurality of physical units, in which the physical units include at least one backup physical unit, and said backup physical unit is configured to be accessed only by a specific command set, and the said backup physical unit stores at least one customized data. The method includes: receiving a specific read command from a host system for reading said backup physical unit when the memory storage device is capable of receiving and processing commands from the host system, and the specific read command belongs to the specific command set. The method further includes: transmitting the customized data within said backup physical unit to the host system. The method further includes: writing all of the customized data from the host system into a corresponding physical unit to restore the memory storage device to a factory setting when receiving a writing command from the host system for writing the customized data.

From another aspect, the invention provides a memory storage device, which includes a rewritable non-volatile memory module, a connector and a memory controller. The memory controller is coupled to the rewritable non-volatile memory module and the connector. In which, the rewritable non-volatile memory module includes a plurality of physical units, said physical units includes at least one backup physical unit, and said backup physical unit is configured to be accessed only by a specific command set and stored with at least one customized data. The memory controller is configured for receiving a specific read command from a host system for reading said backup physical unit and transmitting the customized data within said backup physical unit to the host system when the memory storage device is coupled to the host system by the connector and capable of receiving and processing commands from the host system, and the specific read command belongs to the specific command set. The memory controller is further configured for writing the customized data from the host system into a corresponding physical unit to restore the memory storage device to a factory setting when receiving a writing command from the host system for writing the customized data.

From yet another aspect, the invention provides a repairing method of a memory storage device, in which the memory storage device has a rewritable non-volatile memory module and a boot ROM, and the rewritable non-volatile memory module includes a plurality of physical units, and said physical units include at least one backup physical unit, and said backup physical unit is configured to be accessed only by a specific command set. The method includes: receiving a specific read command from a host system for reading said backup physical unit when the memory storage device is coupled to the host system and only capable of executing boot codes within the boot ROM, and the specific read command belongs to the specific command set. The method further includes: transmitting the customized data within said backup physical unit to the host system. The method further includes: writing the customized data from the host system into a corresponding physical unit to restore the memory storage device to a factory setting when receiving a writing command from the host system for writing the customized data.

From yet another aspect, the invention provides a memory storage device, which includes a rewritable non-volatile memory module, a connector and a memory controller. The memory controller is coupled to the rewritable non-volatile memory and the connector. In which, the rewritable non-volatile memory module includes a plurality of physical units, said physical units includes at least one backup physical unit, and said backup physical unit is configured to be accessed only by a specific command set, in which the specific command set includes the specific read command. The memory controller is configured for transmitting the customized data within the backup physical unit when the memory storage device is coupled to a host system and only capable of executing boot codes within the boot ROM while receiving a specific read command from the host system for reading the at least one backup physical unit. The memory controller is configured for writing the customized data from the host system into a corresponding physical unit to restore the memory storage device to a factory setting when receiving a writing command from the host system for writing the customized data.

In view of above, the invention is directed to additionally store the customized data related to production information and structure information into the backup physical units that are highly restricted for accessing. When the memory storage device leaves the factory, if the host system at client end accesses said backup units thorough the specific command set, the memory storage device may refill the customized data which backed up in the backup physical unit to the corresponding storing address. Accordingly, the memory storage device may be restored to the factory state in accordance to the production information and structure information.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the invention more comprehensible, several embodiments accompanied with drawings are described in detail as follows.

BRIEF DESCRIPTION OF THE DRAWINGS

FIG. 5 is a schematic diagram illustrating a recovering structure table according to an exemplary embodiment of the invention.

DESCRIPTION OF THE EMBODIMENTS

Figure 1A:
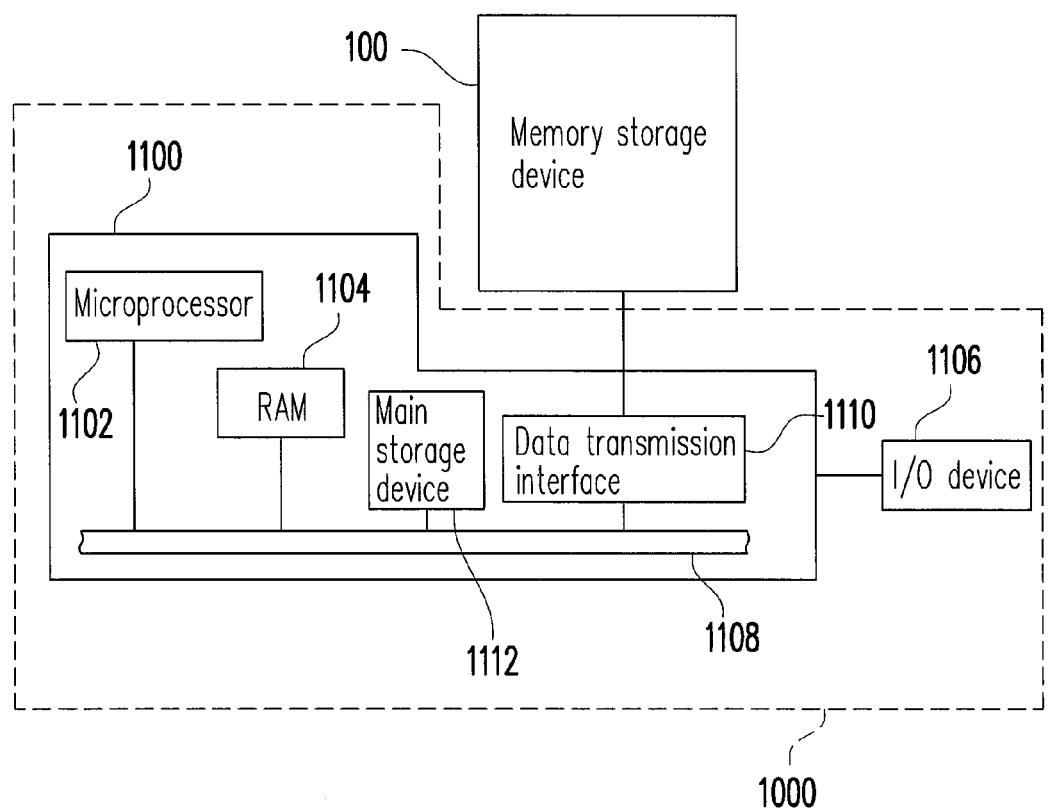
FIG. 1A is a schematic diagram of a host system using a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Generally, a memory storage device (a.k.a. the memory storage device) includes a rewritable non-volatile memory module and a controller (a.k.a. the control circuit). The memory storage device is usually configured together with a host system so that the host system may write data into or read data from the memory storage device.

FIG. 1A is a schematic diagram of a host system using a memory storage device according to an exemplary embodiment of the invention.

Figure 1B:
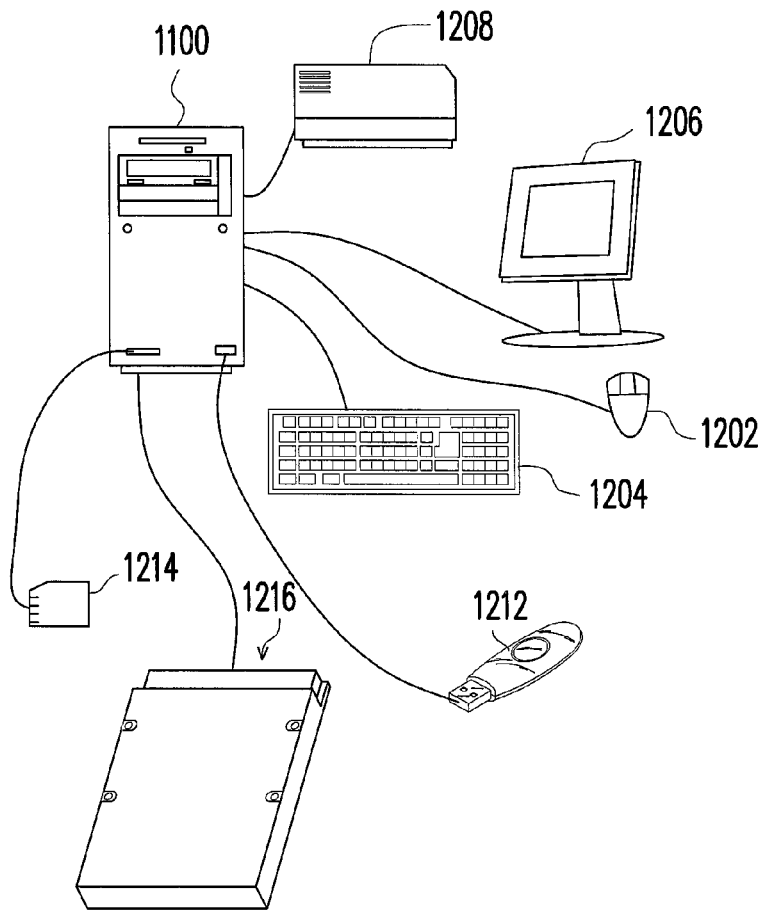
FIG. 1B is a schematic diagram of a computer, an input/output device, and a memory storage device according to an exemplary embodiment of the invention.

The host system 1000 includes a computer 1100 and an input/output (I/O) device 1106. The computer 1100 includes a microprocessor 1102, a random access memory (RAM) 1104, a system bus 1108, a data transmission interface 1110 and a main storage device 1112. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

In the exemplary embodiment of the invention, the memory storage device 100 is coupled to other devices of the host system 1000 through the data transmission interface 1110. By using the microprocessor 1102, the RAM 1104 and the Input/Output device 1106, the host system 1000 may write data into or read from the memory storage device 100. For example, the memory storage device 100 may be a memory card 1214, a flash drive 1212, or a solid state drive (SSD) 1216 as shown in FIG. 1B.

Figure 1C:
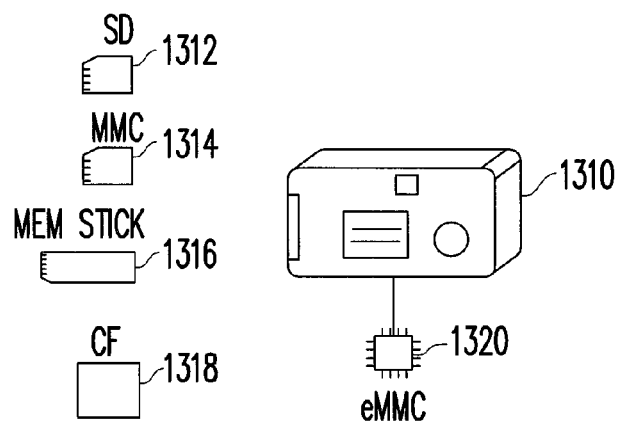
FIG. 1C is a schematic diagram of a host system and a memory storage device according to another exemplary embodiment of the invention.

Generally, the host system 1000 may be any system capable of storing data. Although the present exemplary embodiment is described using a computer system as the host system 1000, in another exemplary embodiment of the invention, the host system 1000 may also be a cell phone, a digital camera, a video camera, a telecommunication device, an audio player or a video player. For example, when the host system is a digital camera 1310, the memory storage device may be a SD (Secure Digital) card 1312, a MMC (Multimedia Card) card 1314, a memory stick 1316, a CF (Compact Flash) card 1318 or an embedded storage device 1320 (as shown in FIG. 1C). The embedded storage device 1320 includes an embedded MMC (eMMC). It should be mentioned that the eMMC is directly coupled to a substrate of the host system.

Figure 2:
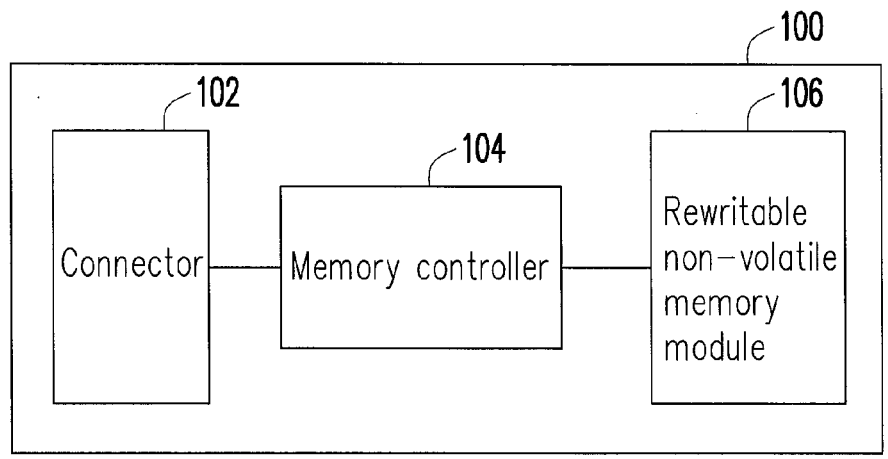
FIG. 2 is a schematic block diagram of the memory storage device in FIG. 1A.

FIG. 2 is a block diagram of the memory storage device 100 in FIG. 1A. Referring to FIG. 2, the memory storage device 100 includes a connector 102, a memory controller 104 and a rewritable non-volatile memory module 106.

The connector 102 is coupled to the memory controller 104 and configured for coupling to the host system 1000. In the present exemplary embodiment, the type of data transmission interface supported by the connector 102 is Universal Serial Bus (USB) interface. However, in other exemplary embodiments, the connector 102 may also be a serial advanced technology attachment (SATA) interface, an embedded MMC (eMMC) interface, a Parallel Advanced Technology Attachment (PATA) interface, an Institute of Electrical and Electronic Engineers (IEEE) 1394 interface, a peripheral component interconnect (PCI) Express interface, a secure digital (SD) interface, a memory stick (MS) interface, a compact flash (CF) interface, an integrated device electronics (IDE) interface or other suitable interfaces, the invention is not limited thereto.

The memory controller 104 executes a plurality of logic gates or control commands which are implemented in a hardware form or in a firmware form, so as to perform operations of writing, reading or erasing data in the rewritable non-volatile memory module 106 according to the commands of the host 1000. In which, based on the repairing method of the present exemplary embodiment, the memory controller 104 is specially used to backup important information of the memory storage device 100 related to production and structure information before leaving the factory. The backup data may restore the memory storage device 100 to factory setting when receiving a command that belongs to a specific command set from the host system 1000.

The rewritable non-volatile memory module 106 is coupled to the memory controller 104. The rewritable non-volatile memory module 106 includes a plurality of physical units. In an exemplary embodiment, each physical unit is composed by a physical block (a physical block includes a plurality of physical pages). Nonetheless, the invention is not limited thereto. In other exemplary embodiments, each physical unit may also be composed by a plurality of physical blocks, the number of the physical units composed is not limited in particularly in the invention. For example, the rewritable non-volatile memory module 106 is a Multi Level Cell (MLC) NAND flash memory module, but the invention is not limited thereto. The rewritable non-volatile memory module 106 may also be a Single Level Cell (SLC) NAND flash memory module, other flash memory modules or any memory module having the same features.

Figure 3:
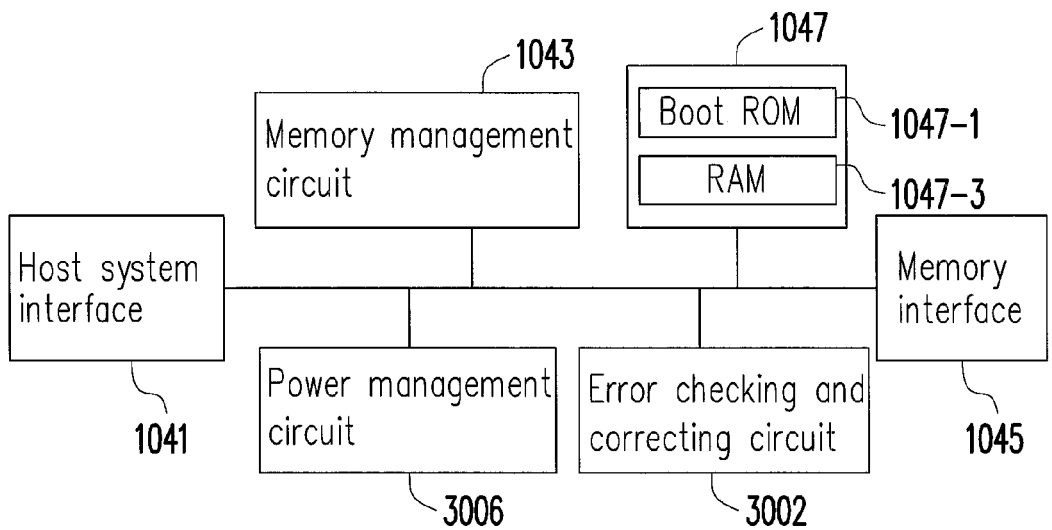
FIG. 3 is a schematic block diagram of a memory controller according to an exemplary embodiment of the invention.

FIG. 3 is a schematic block diagram of a memory controller according to an exemplary embodiment of the invention. Referring to FIG. 3, the memory controller 104 includes a host system interface 1041, a memory management circuit 1043, a memory interface 1045 and a storage unit 1047.

The host system interface 1041 is coupled to the memory management circuit 1043, and configured for coupling to the host system 1000 through the connector 102. The host system interface 1041 is configured for receiving and identifying commands and data transmitted from the host system 1000. Further, the commands and data transmitted from the host system 1000 are transmitted to the memory management circuit 1043 through the host system interface 1041. In the present exemplary embodiment, the host system interface 1041 is a USB interface which is corresponding to the connector 102. In other exemplary embodiments, the host system interface 1041 may also be a SATA interface, an MMC interface, a PATA interface, an IEEE 1394 interface, a PCI Express interface, a SD interface, an MS interface, a CF interface, an IDE interface, or other suitable interfaces.

The storage unit 1047 is coupled to the memory management circuit 1043. The storage unit 1047 at least includes a boot ROM 1047-1 and a random access memory (RAM) 1047-3. In which, the boot ROM 1047-1 configured for storing boot codes. The RAM 1047-3 may be a static random access memory (SRAM) or a dynamic random access memory (DRAM), the invention is not limited thereto. The RAM 1047-3 is configured for temporarily storing commands and data from the host system 1000 or data from the rewritable non-volatile memory module 106.

The memory management circuit 1043 is configured for controlling overall operations of the memory controller 104. More specifically, the memory management circuit 1043 has a plurality of control commands, the control commands are executed to perform operations on the rewritable non-volatile memory module 106 when the memory storage device 100 is powered on.

In the present exemplary embodiment of the invention, the control commands of the memory management circuit 1043 may be stored as program codes (i.e., firmware codes) in a specific area of the rewritable non-volatile memory module 106 (e.g., the system area in the rewritable non-volatile memory module 106 exclusively used for storing system data). In addition, the memory management circuit 1043 has a microprocessor unit (not illustrated). The boot code within the boot ROM 1047-1 is executed by the microprocessor unit to load the control commands stored in the rewritable non-volatile memory module 106 to the RAM 1047-3 when the memory controller 104 is enabled. Next, the control commands are executed by the microprocessor unit in responding to the command of the host system 1000 to access the rewritable non-volatile memory module 106.

In another exemplary embodiment of the invention, the control commands of the memory management circuit 1043 may also be implemented in a form of firmware. For example, the memory management circuit 1043 has a microprocessor unit (not illustrated) and a ROM (not illustrated), and the control commands are burned into the ROM. During the operation of the memory storage device 100, the commands are executed by the microprocessor unit in responding to the command of the host system 1000 to access the rewritable non-volatile memory module 106.

Further, in another exemplary embodiment of the invention, the control commands of the memory management circuit 1043 may also be implemented in a form of hardware. For example, the memory management circuit 1043 includes a microprocessor, a memory management unit, a memory writing unit, a memory reading unit, a memory erasing unit and a data processing unit. The memory management unit, the memory writing unit, the memory reading unit, the memory erasing unit and the data processing unit are coupled to the microprocessor. In which, the memory management unit is configured for managing the physical units of the rewritable non-volatile memory module 106. The memory writing unit is configured for providing a writing command to the rewritable non-volatile memory module 106, thereby writing data into the rewritable non-volatile memory module 106. The memory reading unit is configured for providing a reading command to the rewritable non-volatile memory module 106, thereby reading data from the rewritable non-volatile memory module 106. The memory erasing unit is configured for providing an erasing command to the rewritable non-volatile memory module 106, thereby erasing data from the rewritable non-volatile memory module 106. The memory processing unit is configured for processing data for writing into the rewritable non-volatile memory module 106 and data read from the rewritable non-volatile memory module 106.

The memory interface 1045 is coupled to the memory management circuit 1043 and configured for coupling the memory controller 104 and the rewritable non-volatile memory module 106. In this case, the memory controller 104 may perform related operations to the rewritable non-volatile memory module 106. That is, the data for writing into the rewritable non-volatile memory module 106 is converted to a format acceptable to the rewritable non-volatile memory module 106 through the memory interface 1045.

In another exemplary embodiment of the invention, the memory controller 104 further includes an error checking and correcting unit 3002. The error checking and correcting circuit 3002 is coupled to the memory management circuit 1043 and configured for performing an error checking and correcting process to ensure the correctness of data. Specifically, when a writing command from the host system 1000 is received by the memory management circuit 1043, the error checking and correcting circuit 3002 generates an error checking and correcting code (ECC code) for data corresponding to the writing command, and the memory management circuit 1043 writes the data and the ECC code corresponding to the writing command into the rewritable non-volatile memory module 106. Next, when reading data from the rewritable non-volatile memory module 106, the memory management circuit 1043 also reads the ECC Code corresponding to such data, and the error checking and correcting circuit 3002 performs an error checking and correcting process to the read data based on the read ECC code, so as to identify whether data has error bits.

In yet another exemplary embodiment of the invention, the memory controller 104 further includes a power management circuit 3006. The power management unit 3006 is coupled to the memory management circuit 1043 and configured for controlling the power of the memory storage device 100.

Figure 4:
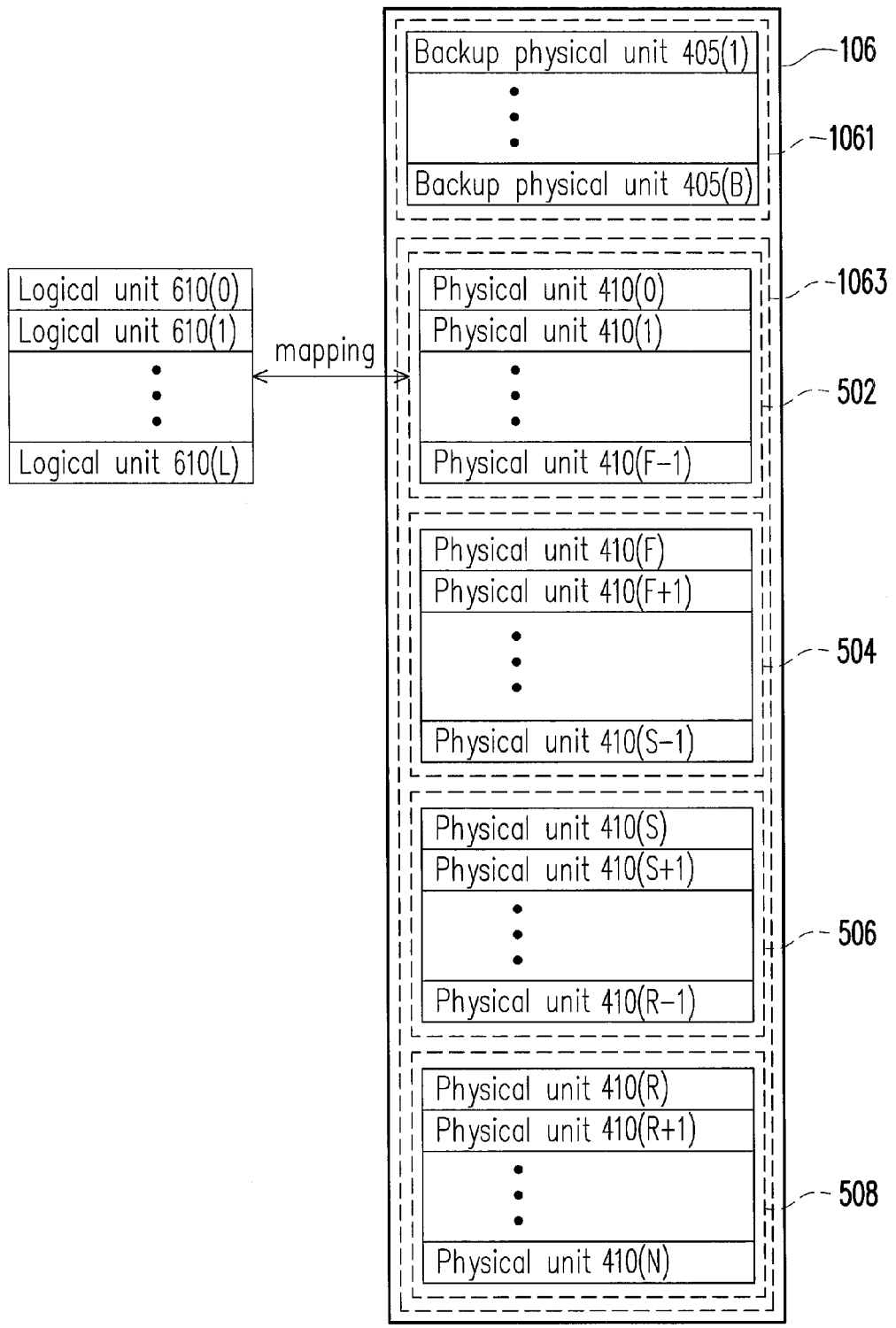
FIG. 4 is a schematic diagram illustrating management of physical units according to an exemplary embodiment of the invention.

FIG. 4 is a schematic diagram illustrating management of physical units of a rewritable non-volatile memory module according to an exemplary embodiment of the invention. The terms, such as "retrieve", "exchange", "group", "alternate" and so forth, are logical concepts which describe operations in the physical units of the rewritable non-volatile memory module 106. That is, the physical units of the rewritable non-volatile memory module 106 are logically operated, but actual positions of the physical units of the rewritable non-volatile memory module 106 are not changed.

Referring to FIG. 4, the memory controller 104 divides all physical units of the rewritable non-volatile memory module 106 into at least a backup area 1061 and a usage area 1063 during the manufacturing process (i.e., before leaving the factory) of the memory storage device 100. In which, the backup area 1061 includes backup physical units 405(1) to 405(B) with B being an positive integer. The backup physical units 405(1) to 405(B) are configured to be accessed only by a specific command set. The specific command set includes various vendor commands such as a specific read command, a specific writing command and a specific erasing command. The memory controller 104 may not perform operations of writing, reading or erasing data to the backup area 1061 unless a command which belongs to the specific command set is received.

The usage area 1063 includes physical units 410(0) to 410(N). The memory management circuit 1043 in the memory controller 104 logically groups the physical units 410(0) to 410(N) into a data area 502, a spare area 504, a system area 506 and a replacement area 508. In which, marks F, S, R and N as illustrated in FIG. 4 are positive integers, each representing the number of the physical units configured in each area, and may be varied based on a capacity of the rewritable non-volatile memory module 106 used by the manufacturer of the memory storage device 100.

Logically, the physical units belonged to the data area 502 and the spare area 504 are configured for storing data from the host system 1000. Specifically, the physical units of the spare area 502 is regarded as the physical units that have been stored with data, whereas the physical units of the spare area 504 are physical units configured for writing new data. In other words, the physical units of the spare area 504 are either blank or available physical units (i.e., no data recorded or data marked as invalid). When receiving a writing command and data from the host system 1000, the memory management unit 1043 retrieves a physical unit from the spare area 504 and writes data into the retrieved physical unit, so as to replace the physical unit in the data area 502. Alternatively, when a required data merging operation to a logical unit is performed, the memory management circuit 1043 retrieves a physical unit from the spare area 504 and writes data therein, so as to replace to the physical unit previously mapped with said logical unit.

The physical units logically belonged to the system area 506 is configured for recording system data. For example, system data includes information related to firmware code, manufacturer and model of the rewritable non-volatile memory module 106, the number of physical blocks in the rewritable non-volatile memory module 106, the number of the physical pages in each physical block, and so forth. It should be mentioned that in FIG. 4, the backup area 1061 is illustrated independently outside of the usage area 1063. However, in practice, the backup physical units 405(1) to 405(B) within the backup area 1061 are belonged to the physical units of the system area 506. Therefore FIG. 4 is illustrated merely for clarity of the description.

When a physical unit in the data area 502, the spare area 504 or the system area 506 is damaged, the physical unit logically belonged to the replacement area 508 is for replacing such damaged physical unit. More specifically, during the operation of the memory storage device 100, if there are still available physical units in the replacement area 508 in the case where the physical unit in the data area 502 is damaged, the memory management circuit 1043 retrieves an available physical unit from the replacement area 508 for replacing the damaged physical unit in the data area 502. Therefore, during the operation of the memory storage device 100, the physical units of the data area 502, the spare area 504, the system area 506 and the replacement area 406 may be dynamically changed. For example, the physical units used for storing data alternately may be dynamically belonged to the data area 502 or the spare area 504.

In order to allow the host system 100 to access the rewritable non-volatile memory module 106, the memory management circuit 1043 configures a plurality of logical units 610(0) to 610(L) for mapping to the physical units 410(0) to 410(F−1) in the data area 502. More specifically, the memory management circuit 1403 provides the configured logical units 610(0) to 610(L) to the host system 1000, and maintains a logical unit-physical unit mapping table for recording the corresponding relations of the logical unit 610(0) to 610(L) and the physical units 410(0) to 410(F−1). Therefore, when the host system 1000 is intended to access a logical address, the memory management circuit 1043 searches a physical unit mapped to said logical address based on the logical unit-physical unit mapping table for accessing.

In the present exemplary embodiment, before the memory storage device 100 leaves the factory, manufacturer will format the rewritable non-volatile memory module 106 for the first time. More specifically, the manufacturer may use a mass production tool to instruction the memory controller 104 to perform an initialization process to the physical units 410(0)

to 410(N) within the usage area 1063. For example, the memory controller 104 erases all data from each page address within the physical units 410(0) to 410(N) to a 0xFF data, and performs a disk scanning (e.g., a reading/writing test) to identify normal physical units from damaged physical units. Next, writing customized data such as production information and a structure information related to the memory storage device 100 into the usage area 1063 (e.g., writing into the system area 506 which is used to store system data). In which, the customized data may include at least one of a master boot record (MBR), a boot sector, a file allocation table, a root directory, a device specification information (e.g., speed, capacity, model and production name of the memory storage device 100), a customized application, a burner software and firmware codes. Furthermore, a part of the customized data is data that may be accessed indirectly by a reading/writing operation from a user during the operation of the memory storage device 100. For example, when the user is intended to write data into the memory storage device 100, or to delete, erase data from the memory storage device 100, even though the user is not directly modifying the file allocation table, the content of the file allocation table may be changed accordingly. Another part of the customized data is data that related to maintain the main operations of the memory storage device 100 such as a burner software or firmware codes, this type of the customized data may not be modified directly or indirectly by the user. A yet another part of the customized data relates to the additional feature of the memory storage device 100 (e.g., such as customized application), this type of the customized data may be added or deleted using a specific command or tool.

Moreover, the mass production tool may instruction the memory controller 104 using the specific command set to write all customized data (established and written into the usage area 1063 during the first time of formatting the rewritable non-volatile memory module 106) additionally to the backup physical units 405(1) to 405(B) within the backup area 1061. For example, the mass production tool may firstly issue a specific erasing command of the specific command set, so that the memory controller 104 may erase the data within the backup physical units 405(1) to 405(B). Next, the mass production toll issues a specific writing command, so that the memory controller 104 may write the customized data into the backup physical units 405(1) to 405(B). It is noted that, although a specific type of customized data is stored in the usage area 1063 using an entire physical unit, the actual data volume may be smaller than a designated volume of one physical unit. In the present exemplary embodiment, when writing various customized data into the backup area 1061, the memory controller 104 incorporates the customized data according to its size to the backup physical unit 405(1) to 405(B). Namely, the amount of the physical units used for storing all customized data in the usage area 1603 may be larger than the number of the backup physical units 405(1) to 405(B). For example, it is assumed that each physical unit is a physical block in the present exemplary embodiment, the memory controller 104 uses a entire physical block in the usage area 1063 as a storage space for a device specification information even though the device specification information merely occupies two physical pages. However, in the present exemplary embodiment, when writing the device specification information into the backup area 1061, the memory controller 104, for example, writes other customized data such as the file allocation table and the device specification information into the same backup physical unit. That is, the device specification information does not occupy one entire physical unit all by itself.

In addition, during the operation of formatting the memory storage device 100 for the first time, the mass production tool further issues a specific writing command to instruction the memory controller 104 to establish a recovering structure table in each of the physical units 405(1) to 405(B), and each recovering structure table records a corresponding relation between a logical address and the customized data recorded in the corresponding backup physical unit. In which, each logical address is respectively mapped to a physical unit corresponding to each customized data, wherein the physical units is in the usage area 1063 and the customized data is written therein. FIG. 5 is a schematic diagram illustrating a recovering structure table according to an exemplary embodiment of the invention. Referring to FIG. 5, the recovering structure table 50 includes a customized data name filed 53 and a logical address field 55. In which, a logical address corresponding to the MBR is LBA(10), a logical address corresponding to the boot sector is LBA(20), a logical address corresponding to the file allocation table is LBA(30), a logical address corresponding to the root directory is LBA(40), a logical address corresponding to the device specification information is LBA(50) and a logical address corresponding to the customized application is LBA(100).

In other exemplary embodiment, the memory controller 104 records a checksum corresponding to each customized data in the recovering structure table. For example, adding a field in the recovering structure table 50 as shown in FIG. 5 to record the checksum of each customized data. In addition, if the number of the backup physical units 405(1) to 405(B) is greater than 1, then each recovering structure table may further records a physical address of the next backup physical unit. For example, adding a new field in the end of the recovering structure table 50 to record a physical address of the next backup physical unit.

In view of above, before the memory storage device 100 leaves the factory, the memory controller 104 may divide the backup area 1061 which may only be accessed by the specific command set from all of the physical units within the rewritable non-volatile memory module 106, and additionally backs up various customized data (established during formatting the memory storage device 100 for the first time) to the backup physical units 405(1) to 405(B) within the backup area 1061.

When the memory storage device 100 has left the factory and sold to the user, if the user discovers that the memory storage device 100 operates abnormally during the operation, a repairing application may be downloaded to the main storage device 1122 by connecting the service web site provided by the manufacturer through the host system 1000. Alternatively, if the repairing application is stored in a compact disk and sold along with the memory storage device 100 to the user, the user may also install the repairing application within the compact disk to the main storage device 1112. When the memory storage device 100 is connected to the host system 1000, the user may execute the repairing application in the host system 1000 to control the memory controller 104 in the memory storage device 100 to restore the memory storage device 100 to a factory setting according to the commands from the repairing application. In other words, the user may complete the recovering process of the memory storage device 100 by using the repairing application.

More specifically, when the memory storage device 100 is connected to the host system 1000 and the memory storage device 100 is capable of receiving and processing commands from the host system 1000, which indicating that the memory controller 104 may access the rewritable non-volatile memory module 106 according to commands issued by the host system 1000. In this case, once the repairing application is activated by the host system 1000, the repairing application may issue a specific read command to the memory storage device for reading the backup physical units 405(1) to 405(B). When the specific read command is received by the memory controller 104, all of the customized data within the backup physical units 405(1) to 405(B) and the recovering structure table are transmitted together to the host system 1000. For example, for each of the customized data, the memory controller 1045 may obtain the checksum from the recovering structure table and confirm the accuracy of the customized data using cyclic redundancy check (CRC) process, and transmitting the customized data to the host system 1000 when no error is found.

After the recovering structure table and customized data are transmitted by the memory storage device 100 are received by the host system 1000, the repairing application sent a plurality of writing command according to contents of the recovering structure table, so that each customized data may be written back into the usage area 1063 of the rewritable non-volatile memory module 106. In which, a logical address to be written included in each write command is the logical address corresponding to the customized data recorded in the recovering structure table. In the present exemplary embodiment, the repairing application writes each customized data into the usage area 1063 of the rewritable non-volatile memory module 106 according to a specific sequence (e.g., the priority of the data).

When the writing commands issued by the host system 1000 for writing the customized data are received by the memory controller 104, as for each of the writing commands, the memory controller 104 writes the customized data corresponding to the writing command back to a physical unit of the usage area 1063, wherein the physical unit is mapped to the logical address included in the corresponding write command. After all customized data are written into the usage area 1063, the memory storage device 100 may restore to the factory state in accordance to the production information and structure information.

In an exemplary embodiment, when the memory storage device 100 is coupled to the host system 1000 through the connector 102, if a message of "no media" is received from the memory storage device 100 after an inquiry for the device characteristics is sent by the host system 1000 to the memory storage device 100, a pre-format command may be issued by the repairing application to instruct the memory controller 104 to perform a pre-format process to the memory storage device 100. More specifically, when the pre-format command is received by the memory controller 104, data in all of the physical units 410(0) to 410(N) within the usage area 1063 may be erased and a disk scanning may be performed to all of the physical units 410(0) to 410(N) within the usage area 1063, such that the normal physical units may be identified from the damaged physical units therein. If an available volume corresponding to the normal physical unit is inconsistent with the device volume of the memory storage device 100 (e.g., the available volume has no reached the device volume), the memory controller 104 may send a message related the same to the host system 1000. After receiving the message, the repairing application may update the device volume to the available volume (e.g., updating the volume filed in the file allocation table) and control the memory storage device 100 to perform another check. At this time, since the device volume is consistence with the available volume, after the device characteristics in responding to the inquiry of the host system 1000 is replied by the memory storage device 100, the repairing application may continued to issue the writing command for writing the customized data previously received back to the part of the physical units within the usage area 1063. Namely, in the present exemplary embodiment, before refilling the customized data to the corresponding physical unit, the memory controller 104 is capable of receiving and identifying the pre-format command, and further determining whether a pre-format process is required to the memory storage device 100 based on whether a pre-format command is received. If a pre-format process is required, the pre-format process is then being executed first, followed by refilling the customized data to restore the memory storage device 100 to the factory setting.

Figure 6:
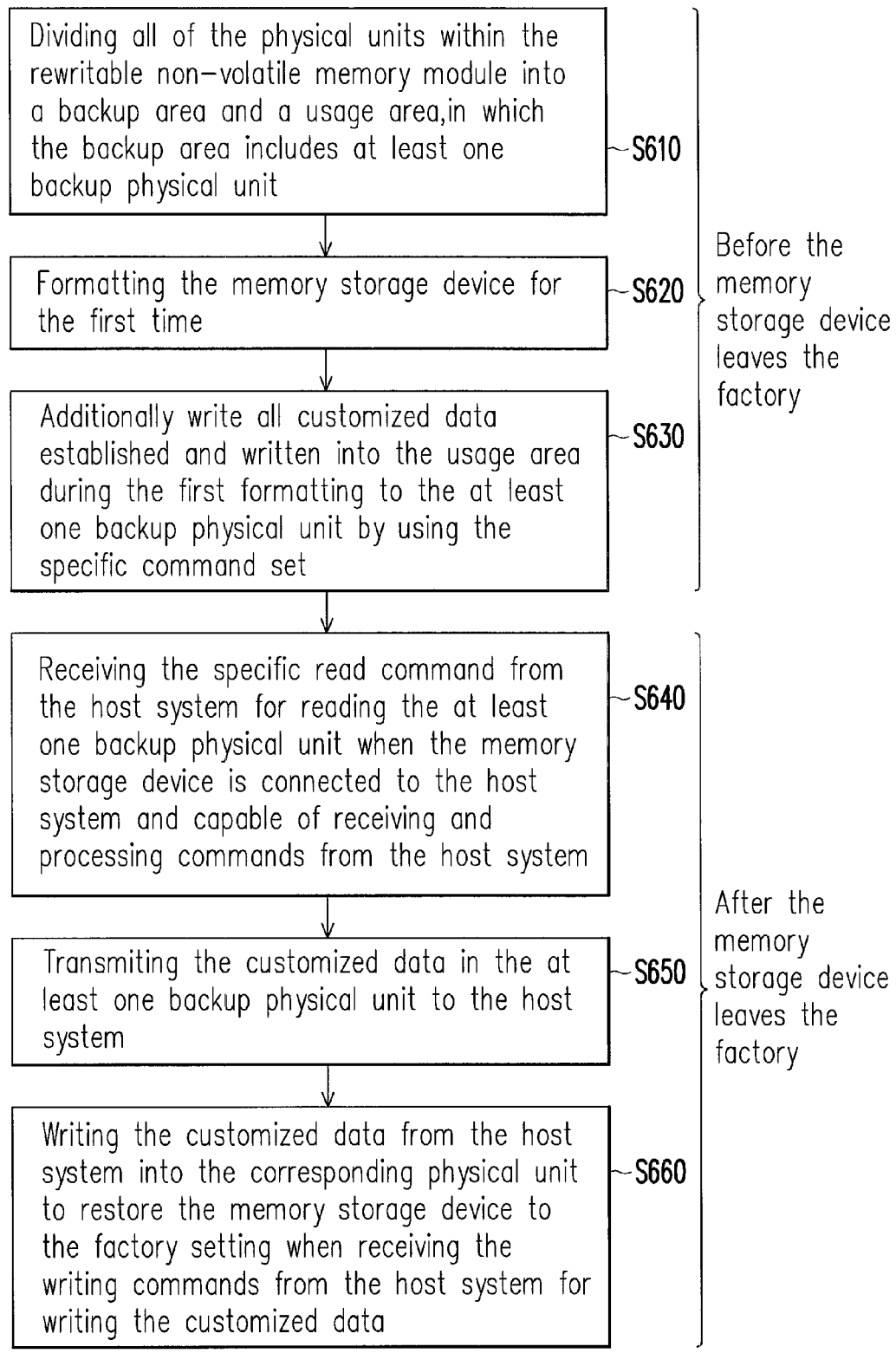
FIG. 6 is a flowchart illustrating a repairing method of a memory storage device according to a first exemplary embodiment of the invention.

FIG. 6 is a flowchart illustrating a repairing method of a memory storage device according to a first exemplary embodiment of the invention.

Referring to FIG. 6, as shown in step S610, before the memory storage device 100 leaves the factory, the memory controller 104 divides all of the physical units within the rewritable non-volatile memory module 106 into the backup area 1061 and the usage area 1063. In which, the backup area 161 includes more than one of the backup physical units 405(1) to 405(B), the backup physical units 405(1) to 405(B) may be accessed only by the specific command set.

In step S620, the mass production tool is used by the manufacturer to format the memory storage device 100 for the first time. In step S630, the memory controller 104 uses the specific command set to additionally write all customized data established during the first formatting which being written into the usage area, to the backup physical units 405(1) to 405(B).

After the memory storage device 100 has left the factory, as shown in step S640, the memory controller 104 receives the specific read command from the host system 1000 for reading the backup physical units 405(1) to 405(B) when the memory storage device 100 is connected to the host system 1000 and capable of receiving and processing commands from the host system 1000, and the specific read command belongs to the specific command set;

In step S650, the memory controller 104 transmits the customized data within the backup physical units 405(1) to 405(B) to the host system 1000.

As shown in step S660, the memory controller 104 writes the customized data from the host system 1000 into the corresponding physical unit to restore the memory storage device 100 to the factory setting when receiving the writing commands from the host system 1000 for writing the customized data.

Figure 7:
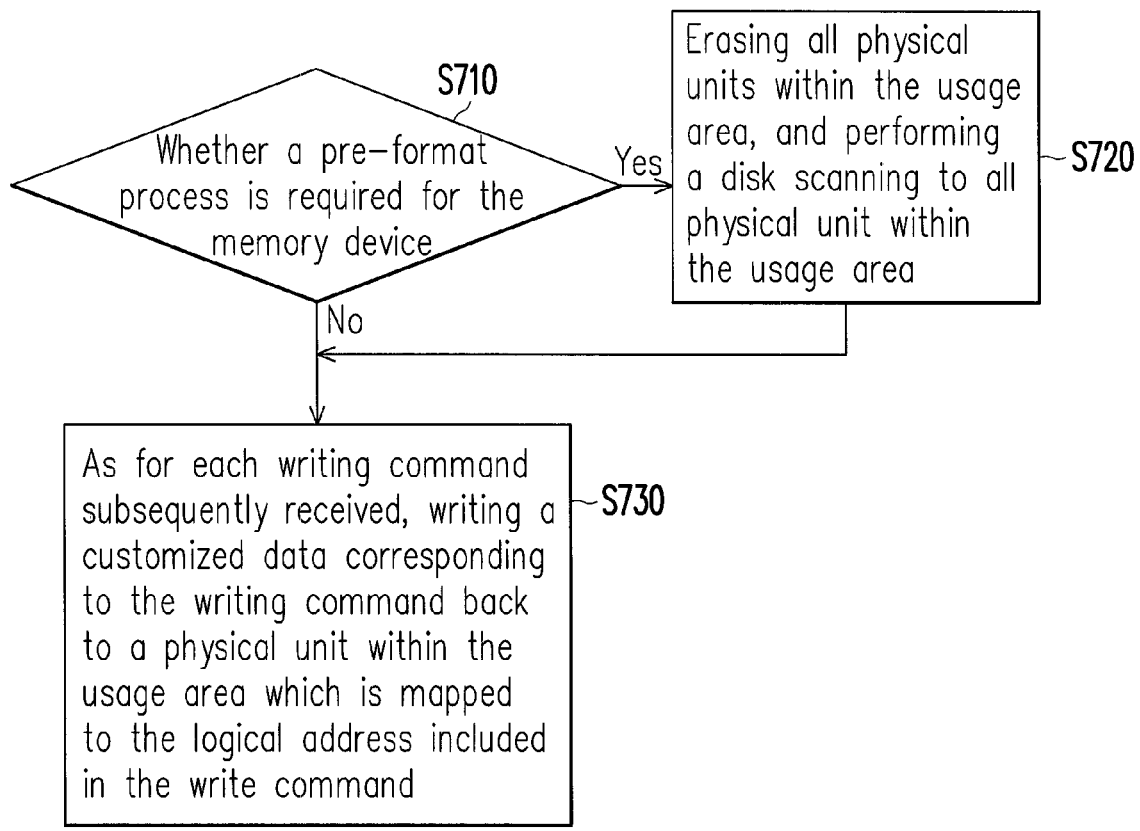
FIG. 7 is a flowchart illustrating a process of restoring the memory storage device to a factory setting by writing the customized data into a usage area according to a first exemplary embodiment of the invention.

FIG. 7 illustrates the detailed description of step S660 in FIG. 6.

Referring to FIG. 7, firstly in step S710, the memory controller 104 determines whether a pre-format process is required for the memory storage device 100. Namely, determining whether the pre-format command issued by the host system 1000 is received.

If the pre-format process is required, as shown in step S720, the memory controller 104 erases all physical units 410(0) to 410(N) within the usage area 1063, and performs a disk scanning to all physical units 410(0) to 410(N) within the usage area 1063.

When step S720 is completed or a result to the determination of step S710 is negative, in step S730, as for each writing command subsequently issued by the host system 1000, the memory controller 104 writing the customized data corresponding to each writing command back to a physical unit mapped to the logical address in the usage area 1063.

Second Exemplary Embodiment

In the present exemplary embodiment, before the memory storage device 100 leaves the factory, the memory controller 104 also divides the backup area 1061 which may only be accessed by the specific command set from all of the physical units within the rewritable non-volatile memory module 106, and additionally backs up all customized data (established during the first time of formatting) to the backup physical units 405(1) to 405(B) within the backup area 1061. However, the difference between the first exemplary embodiment and the second exemplary embodiment lies where after the memory storage device 100 has left the factory and sold to the user, if only the boot code in the boot ROM 1047-1 can be executed by the memory controller 104 due to damages or loss of the firmware code, the user may still execute the repairing application through the host system 1000 to restore the memory storage device 100 to the factory setting.

Figure 8:
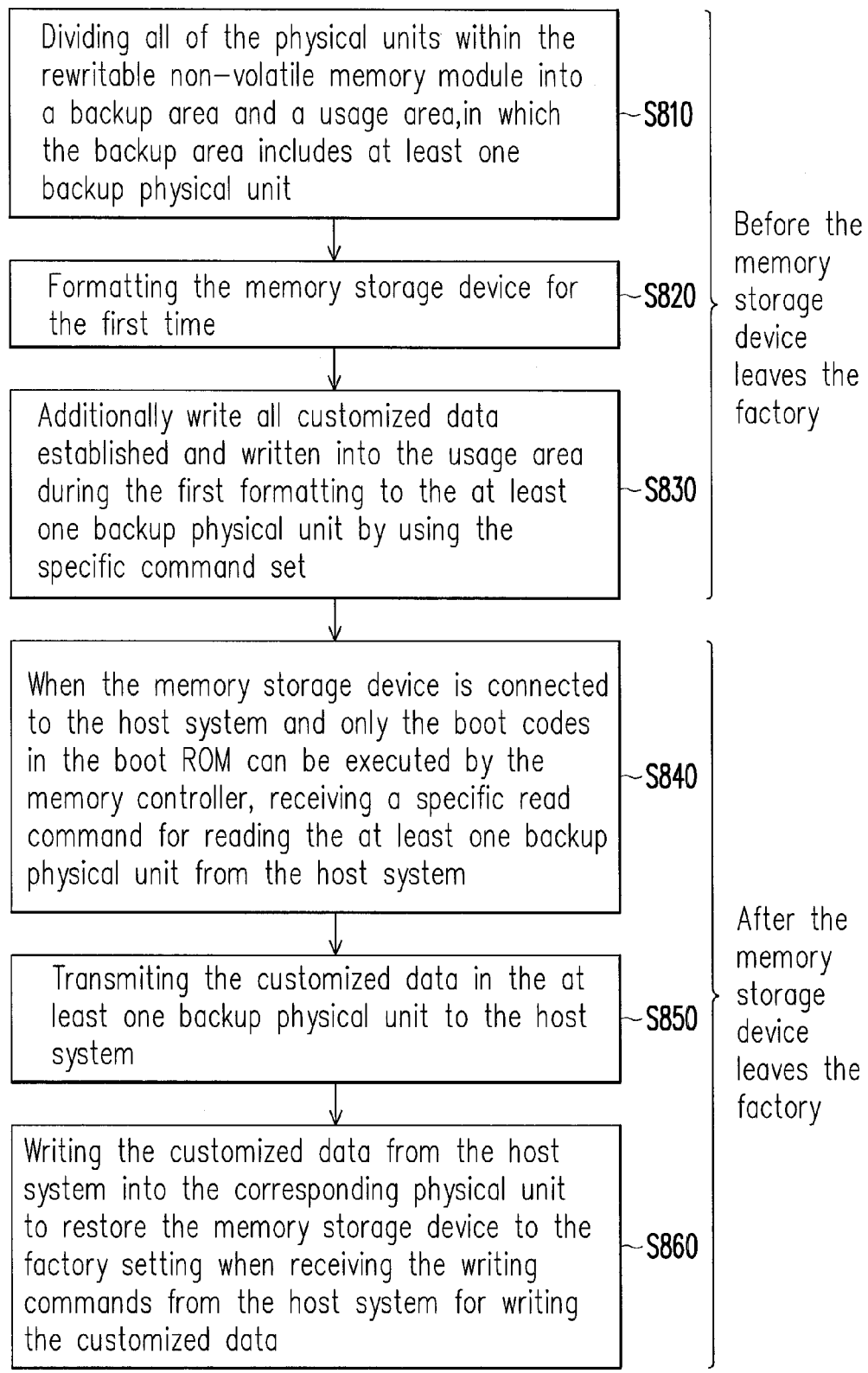
FIG. 8 is a flowchart illustrating a repairing method of a memory storage device according to a second exemplary embodiment of the invention.

FIG. 8 is a flowchart illustrating a repairing method of a memory storage device according to a second exemplary embodiment of the invention.

Referring to FIG. 8, steps S810 through S830 shown in FIG. 8 are the same as or similar to steps S610 through S630 shown in FIG. 6, and it will not described again herein.

After the memory storage device 100 has left the factory, as shown in step S840, when the memory storage device 100 is connected to the host system 1000, and if only the boot codes in the boot ROM 1047-1 can be executed by the memory controller 104 due to damages or loss of the firmware codes, the user may execute the repairing application in the host system 1000. After being executed, the repairing application may issue the specific read command to the memory storage device for reading the backup physical units 405(1) to 405(B). Accordingly, the memory controller 104 receives the specific read command for reading the backup physical units 405(1) to 405(B) from the host system 1000 through the connector 102.

Next in step S850, although the memory controller 104 may only execute the boot codes in the boot ROM 1047-1 currently, but since the boot codes has been added with a function of directly reading the rewritable non-volatile memory module 106, so that the memory storage device 104 may still read the backup physical units 405(1) to 405(B) according to the specific read command, and transmit the customized data and the recovering structure table within the backup physical units 405(1) to 405(B) to the host system 1000.

When each of the customized data and the recovering structure table are received by the host system 1000, one or more writing commands for writing the customized data to the usage area 1063 of the rewritable non-volatile memory module 106 may then sent by the repairing application. As shown in step S860, the memory controller 104 writes the customized data into the corresponding physical unit according to the logical addresses within each writing command to restore the memory storage device 100 to the factory setting when receiving the writing commands from the host system 1000 for writing the customized data.

Namely, in the second exemplary embodiment of the invention, although the memory controller 104 may only execute the boot codes in the boot ROM 1047-1 due to damages or loss of the firmware codes of the memory storage device 100, the memory storage device 104 may still read the backup physical units 405(1) to 405(B) within the rewritable non-volatile memory module 106 according to the specific read command from the host system 1000 and restore the memory storage device 100 to the factory setting with the customized data backed up therein.

Figure 9:
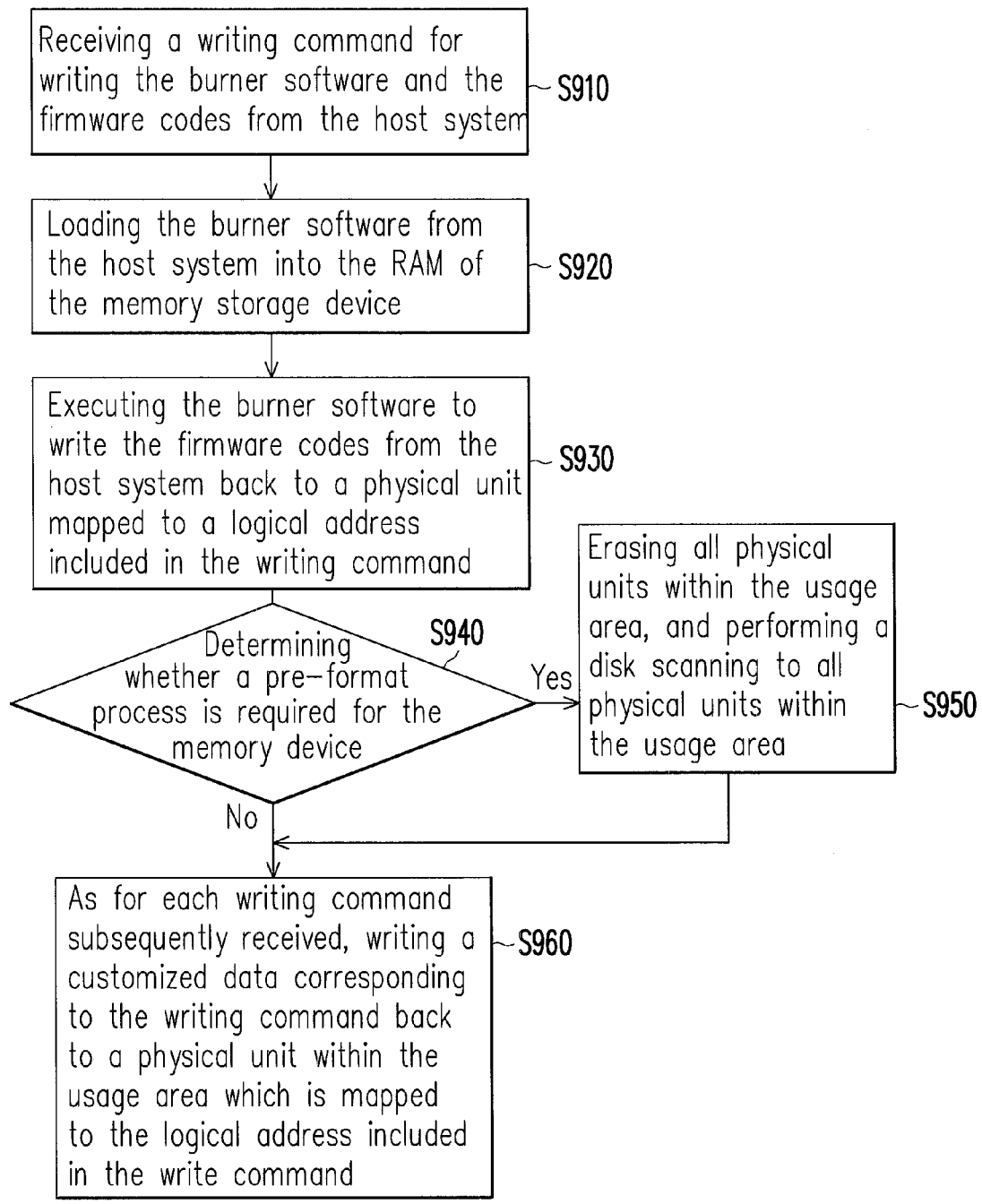
FIG. 9 is a flowchart illustrating a process of restoring the memory storage device to a factory setting by writing the customized data into a usage area according to a second exemplary embodiment of the invention.

FIG. 9 illustrates the detailed description of step S860.

Referring to FIG. 9, in the present exemplary embodiment, the repairing application issues a writing command for writing burner software and the firmware codes, so that the memory controller 104 may receive the writing command for writing the burner software and the firmware codes from the host system 1000, as shown in step S910.

Next in step S920, the memory controller 104 loads the burner software from the host system 1000 into the RAM 1047-3. Next in step S930, the memory controller 104 executes the burner software to write the firmware code from the host system 1000 back to a physical unit within the usage area 1063 that is mapped to a logical address included in the writing command for writing the burner software and the firmware codes. From another viewpoint, the repairing application has a function that adopts in-system-programming (ISP) method for correcting and updating the firmware codes of the memory storage device 100. When the writing command for storing the firmware codes to the physical units within the usage area 1063 is issued by the repairing application, the microprocessor within the memory management circuit 1043 may execute the boot codes within the boot ROM to load the firmware codes within the usage area 1063 to the RAM 1047-3 to complete the process of correcting and updating the firmware codes.

Next in step S940, the memory controller 104 determines whether a pre-format process is required for the memory device 100 (i.e., determining whether a pre-format command issued by the host system 1000 is received).

If the pre-format process is required, as shown in step S950, the memory controller 104 erases all physical units 410(0) to 410(N) within the usage area 1063, and performs a disk scanning to all physical units 410(0) to 410(N) within the usage area 1063.

Next in step S960, as for each writing command subsequently received, the memory controller 104 writes the customized data corresponding to each writing command back to a physical unit in the usage area 1063 mapped to the logical address included in the corresponding write command.

In view of above, the memory storage device and the repairing method of the invention writes the customized data established during formatting the memory storage device for the first time into the backup physical units before the memory storage device leaves the factory. Since the backup physical units may only be accessed by a specific command set, after being sold to the user, the content of the backup physical unit may not be change by normal operations to the memory storage device from the user. Once failure or abnormal operation to the memory storage device occurs, the user may execute the repairing application provided by the manufacturer in the host system at client end. The memory controller of the memory storage device transmits the customized data being backed up within the backup physical units to the host system according to the instruction of the repairing application, and writes each customized data to the physical units of the usage area according to the writing commands issued by the repairing application, thereby restoring the memory storage device to the factory setting. In the case where the user has discovered that the memory storage device being operated abnormally, the user may restore the memory storage device to the factory setting without sending it back to the manufacturer, leading to convenience and time-efficiency. However, the advantages aforementioned are not required in all versions of the invention.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed:

1. A repairing method of a memory storage device having a rewritable non-volatile memory module, the rewritable non-volatile memory module comprises a plurality of physical units, wherein the physical units comprise at least one backup physical unit, and the at least one backup physical unit is configured to be accessed only by a specific command set, wherein the at least one backup physical unit stores at least one customized data, the method comprises:

receiving a specific read command from a host system for reading the at least one backup physical unit when the memory storage device is capable of receiving and processing commands from the host system, wherein the specific read command belongs to the specific command set;

transmitting the at least one customized data within the at least one backup physical unit to the host system; and writing the at least one customized data from the host system into a corresponding physical unit to restore the memory storage device to a factory setting when receiving at least one writing command from the host system for writing the at least one customized data, wherein the at least one backup physical unit further store a recovering structure table, and the recovering structure table records a corresponding relation between the at least one customized data and a logical address.

2. The repairing method of the memory storage device of claim 1, wherein the logical address is mapped to a physical unit corresponding to the at least one customized data, and the step of transmitting the at least one customized data within the at least one backup physical unit to the host system further comprises:

transmitting the recovering structure table and the at least one customized data within the at least one backup physical unit together to the host system.

3. The repairing method of the memory storage device of claim 2, wherein after the step of transmitting the recovering structure table and the at least one customized data within the at least one backup physical unit together to the host system, the method further comprises:

sending the at least one writing command for writing the at least one customized data by the host system according to the recovering structure table, wherein a logical address to be written included in the at least one write command is the logical address corresponding to the at least one customized data recorded in the recovering structure table.

4. The repairing method of the memory storage device of claim 3, wherein the at least one customized data comprises at least one of a master boot record (MBR), a boot sector, a file allocation table, a root directory, a device specification information, a customized application, a burner software and firmware codes, and the step of writing the at least one customized data from the host system into the corresponding physical unit to restore the memory storage device to the factory setting when receiving the at least one writing command from the host system for writing the at least one customized data comprises:

writing the at least one customized data from the host system into the corresponding physical unit by writing a customized data corresponding to each of the at least one writing command back to a physical unit mapped to the logical address included in the corresponding write command.

5. The repairing method of the memory storage device of claim 4, wherein before the step of writing the at least one customized data from the host system into the corresponding physical unit to restore the memory storage device to the factory setting, further comprising:

determining whether a pre-format process is required for the memory storage device; and if the pre-format process is required, erasing all physical units within a usage area, and performing a disk scanning to all physical units within the usage area.

6. The repairing method of the memory storage device of claim 1, wherein the at least one customized data is related to a production information and a structure information of the memory storage device.

7. A memory storage device, comprising:

a rewritable non-volatile memory module, comprising a plurality of physical units, wherein the physical units comprise at least one backup physical unit, and the at least one backup physical unit is configured to be accessed only by a specific command set, wherein the at least one backup physical unit stores at least one customized data;

a connector; and a memory controller, coupled to the rewritable non-volatile memory and the connector, wherein the memory controller is configured for receiving a specific read command from a host system for reading the at least one backup physical unit and transmitting the at least one customized data within the at least one backup physical unit to the host system when the memory storage device is coupled to the host system by the connector and capable of receiving and processing commands from the host system, wherein the specific read command belongs to the specific command set;

the memory controller is further configured for writing the at least one customized data from the host system into a corresponding physical unit to restore the memory storage device to a factory setting when receiving at least one writing command from the host system for writing the at least one customized data, wherein the at least one backup physical unit further store a recovering structure table, and the recovering structure table records a corresponding relation between the at least one customized data and a logical address.

8. The memory storage device of claim 7, wherein the logical address is mapped to a physical unit corresponding to the at least one customized data, and the memory controller is configured for transmitting the recovering structure table and the at least one customized data within the at least one backup physical unit together to the host system.

9. The memory storage device of claim 8, wherein the at least one writing command sent by the host system is configured for writing the at least one customized data, and a logical address to be written included in the at least one write command is the logical address corresponding to the at least one customized data recorded in the recovering structure table.

10. The memory storage device of claim 9, wherein the at least one customized data comprises at least one of a master boot record, a boot sector, a file allocation table, a root directory, a device specification information, a customized application, a burner software and firmware codes, and the memory controller is configured for writing the at least one customized data from the host system into the corresponding physical unit by writing a customized data corresponding to each of the at least one writing command back to a physical unit mapped to the logical address included in the corresponding write command.

11. The memory storage device of claim 10, wherein the memory controller is configured for determining whether a pre-format process is required for the memory storage device before writing the at least one customized data into the corresponding physical unit,
    if the pre-format process is required, the memory controller erases all physical units within a usage area, and performs a disk scanning to all physical units within the usage area.

12. The memory storage device of claim 7, wherein the at least one customized data is related to a production information and a structure information of the memory storage device.

13. A repairing method of a memory storage device, wherein the memory storage device has a rewritable non-volatile memory module and a boot ROM, and the rewritable non-volatile memory module comprises a plurality of physical units, wherein the physical units comprise at least one backup physical unit, and the at least one backup physical unit is configured to be accessed only by a specific command set, the method comprises:
    receiving a specific read command from a host system for reading the at least one backup physical unit when the memory storage device is coupled to the host system and only capable of executing boot codes within the boot ROM, wherein the specific read command belongs to the specific command set;
    transmitting at least one customized data within the at least one backup physical unit to the host system; and
    writing the at least one customized data from the host system into a corresponding physical unit to restore the memory storage device to a factory setting when receiving at least one writing command from the host system for writing the at least one customized data,
    wherein the at least one backup physical unit further store a recovering structure table, and the recovering structure table records a corresponding relation between the at least one customized data and a logical address.

14. The repairing method of the memory storage device of claim 13, wherein the at least one customized data is related to a production information and a structure information of the memory storage device.

15. The repairing method of the memory storage device of claim 13, wherein the logical address is mapped to a physical unit corresponding to the at least one customized data, and the step of transmitting the at least one customized data within the at least one backup physical unit to the host system further comprises:
    transmitting the recovering structure table and the at least one customized data within the at least one backup physical unit together to the host system.

16. The repairing method of the memory storage device of claim 15, wherein after the step of transmitting the recovering structure table and the at least one customized data within the at least one backup physical unit together to the host system, the method further comprises:
    sending the at least one writing command for writing the at least one customized data by the host system according to the recovering structure table, wherein a logical address to be written included in the at least one write command is the logical address corresponding to the at least one customized data recorded in the recovering structure table.

17. The repairing method of the memory storage device of claim 16, wherein the at least one customized data comprises at least one of a master boot record, a boot sector, a file allocation table, a root directory, a device specification information, a customized application, a burner software and firmware codes, and the step of writing the at least one customized data from the host system into the corresponding physical unit to restore the memory storage device to the factory setting when receiving the at least one writing command from the host system for writing the at least one customized data comprises:
    receiving a writing command for writing the burner software and the firmware code from the host system;
    loading the burner software from the host system into a RAM of the memory storage device;
    executing the burner software to write the firmware codes from the host system back to a physical unit within a usage area mapped to a logical address included in the writing command for writing the burner software and the firmware codes; and
    as for the at least one writing command that is subsequently received, writing the at least one customized data from the host system into the corresponding physical unit by writing a customized data corresponding to each of the at least one writing command back to a physical unit mapped to the logical address included in the corresponding write command.

18. The repairing method of the memory storage device of claim 17, wherein after the step of executing the burner software to write the firmware codes from the host system back to the physical unit within the usage area mapped to the logical address included in the writing command for writing the burner software and the firmware codes, the method further comprises:
    determining whether a pre-format process is required for the memory storage device before writing the at least one customized data from the host system into the corresponding physical unit; and
    if the pre-format process is required, erasing all physical units within the usage area, and performing a disk scanning to all physical units within the usage area.

19. A memory storage device, comprising:
    a rewritable non-volatile memory module, comprising a plurality of physical units, wherein the physical units comprise at least one backup physical unit, and the at least one backup physical unit is configured to be accessed only by a specific command set;
    a connector; and
    a memory controller, coupled to the rewritable non-volatile memory and the connector, the memory controller comprises a boot ROM,
    wherein when the memory storage device is coupled to a host system and the memory controller is only capable of executing boot codes within the boot ROM, the memory controller is configured for transmitting at least one customized data within the at least one backup physical unit to the host system while receiving a specific read command from the host system for reading the at least one backup physical unit, wherein the specific read command belongs to the specific command set,
    the memory controller is further configured for writing the at least one customized data from the host system into a corresponding physical unit to restore the memory storage device to a factory setting when receiving at least one writing command from the host system for writing the at least one customized data,
    wherein the at least one backup physical unit further store a recovering structure table, and the recovering structure table records a corresponding relation between the at least one customized data and a logical address.

20. The memory storage device of claim 19, wherein the at least one customized data is related to a production information and a structure information of the memory storage device.

21. The memory storage device of claim 19, wherein the logical address is mapped to a physical unit corresponding to the at least one customized data, and the memory controller is configured for transmitting the recovering structure table and the at least one customized data within the at least one backup physical unit together to the host system.

22. The memory storage device of claim 21, wherein the at least one writing command sent by the host system is configured for writing the at least one customized data, and a logical address to be written included in the at least one write command is the logical address corresponding to the at least one customized data recorded in the recovering structure table.

23. The memory storage device of claim 22, wherein the at least one customized data comprises at least one of a master boot record, a boot sector, a file allocation table, a root directory, a device specification information, a customized application, a burner software and firmware codes, the memory controller is configured for receiving a writing command for writing the burner software and the firmware codes from the host system, loading the burner software from the host system into a RAM of the memory controller, executing the burner software to write the firmware codes from the host system back to a physical unit within a usage area mapped to a logical address included in the writing command for writing the burner software and the firmware codes, and as for the at least one writing command that is subsequently received, writing the at least one customized data from the host system into the corresponding physical unit by writing a customized data corresponding to each of the at least one writing command back to a physical unit mapped to the logical address included in the corresponding write command.

24. The memory storage device of claim 23, wherein after executing the burner software to write the firmware codes from the host system back to the physical unit within the usage area mapped to the logical address included in the writing command for writing the burner software and the firmware codes, the memory controller is further configured for determining whether a pre-format process is required for the memory storage device before writing the at least one customized data from the host system into the corresponding physical unit, if the pre-format process is required, the memory controller erases all physical units within the usage area, and performs a disk scanning to all physical units within the usage area.

* * * * *